Jan. 9, 1968 W. D. ALLISON 3,362,498
VEHICLE SUSPENSION OF THE INDEPENDENT TYPE
FOR DRIVEN REAR WHEELS
Filed Oct. 16, 1964 2 Sheets-Sheet 1
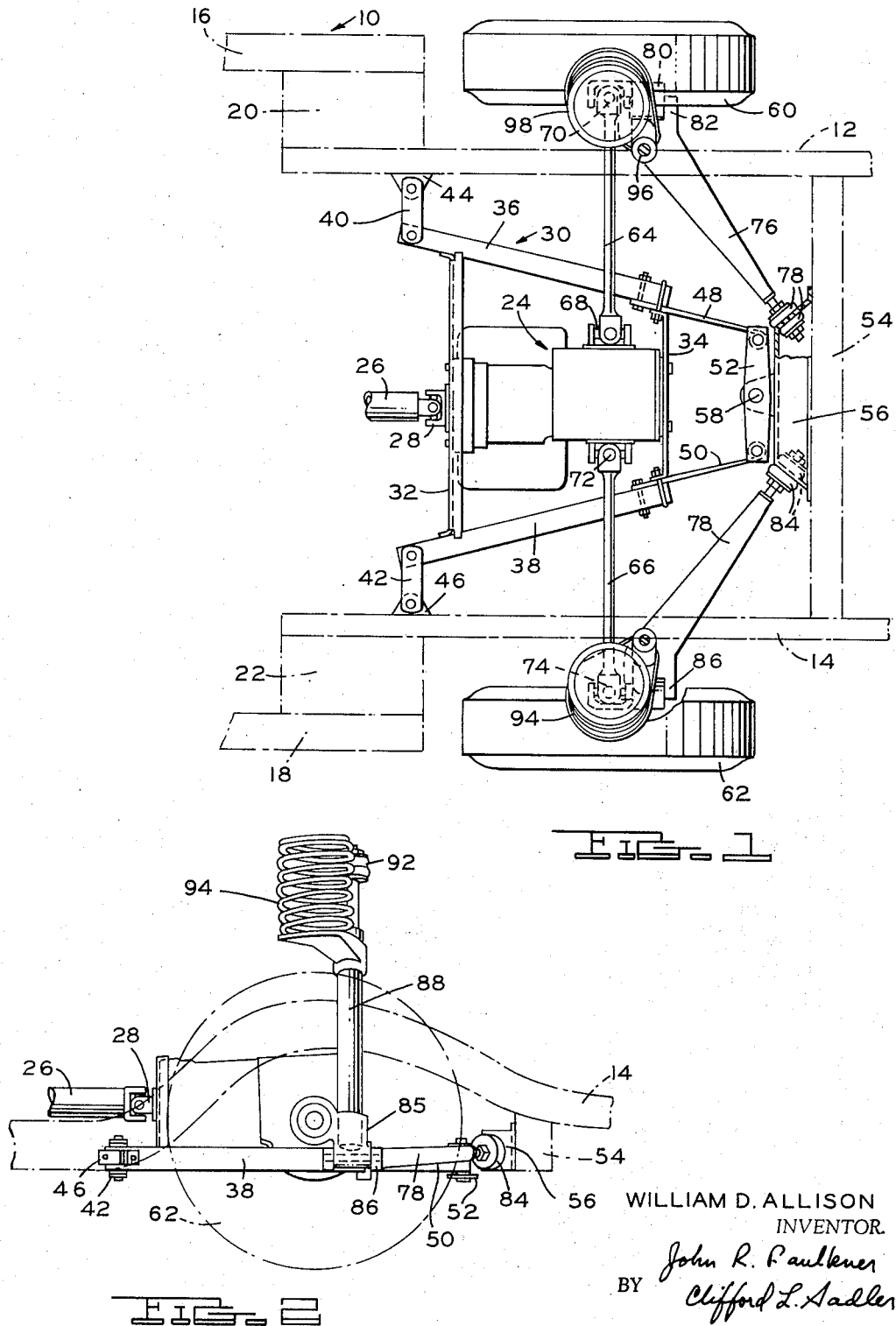
WILLIAM D. ALLISON
INVENTOR.
BY John R. Faulkner
Clifford L. Sadler
ATTORNEYS

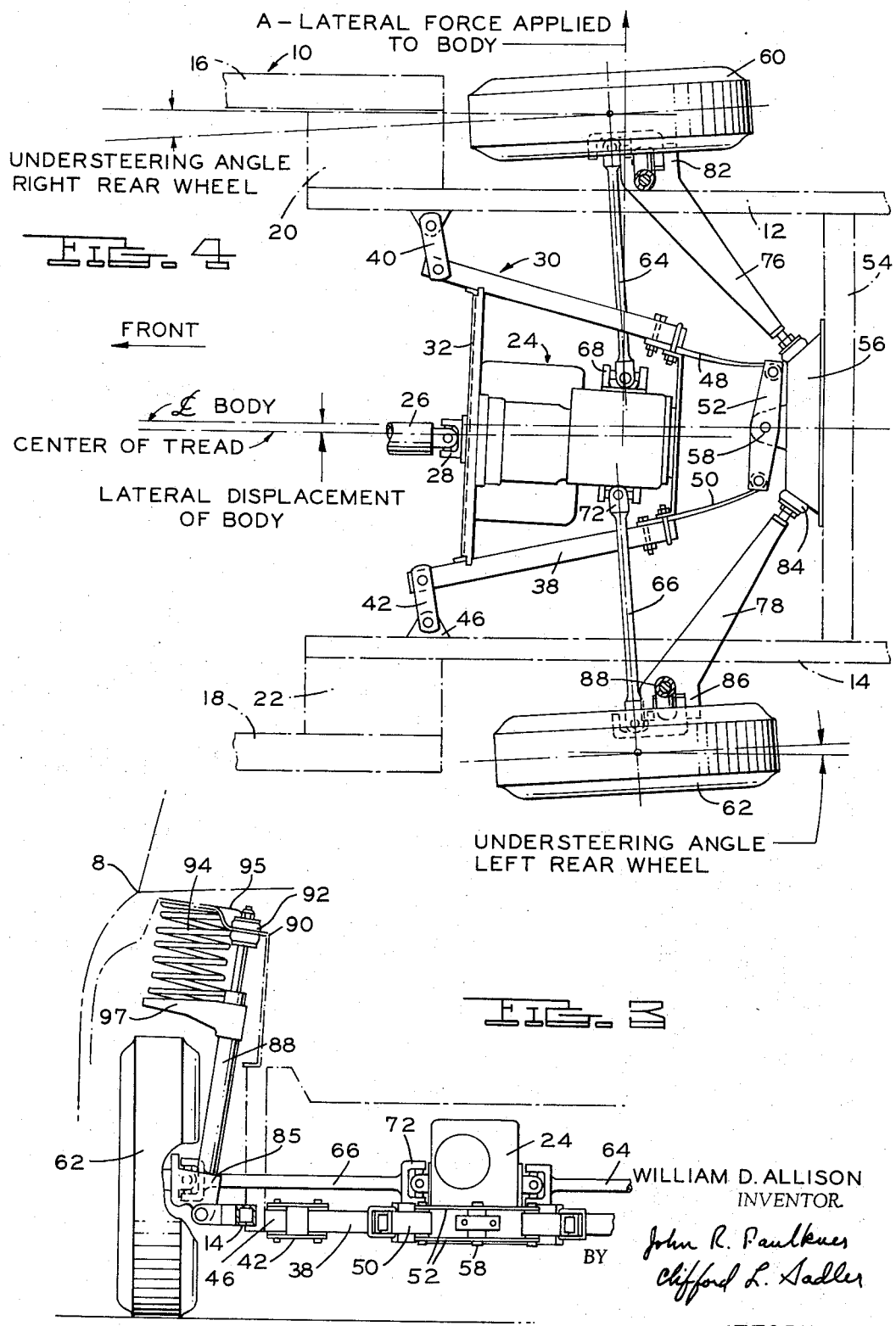

United States Patent Office 3,362,498
Patented Jan. 9, 1968

3,362,498
VEHICLE SUSPENSION OF THE INDEPENDENT TYPE FOR DRIVEN REAR WHEELS
William D. Allison, Grosse Pointe Farms, Mich., assignor to Ford Motor Company, Dearborn, Mich., a corporation of Delaware
Filed Oct. 16, 1964, Ser. No. 404,280
9 Claims. (Cl. 180—73)

The present invention relates generally to vehicle suspension systems, and more particularly to that type of suspension in which the wheels are independently connected to the vehicle body.

The present invention has particular application to the independent suspension of rear driving wheels in a vehicle. While independent rear suspensions are generally well-known, the present invention possesses a number of unique features. One of these is the manner in which the transmission and differential (transaxle) is secured to the vehicle body. A subframe assembly is provided for the transaxle and this subframe is connected to the vehicle frame by three widely spaced mounts. The three mounts incorporate pivotal connections and a portion of the subframe is constructed from leaf spring members. This arrangement permits the vehicle body to move relative to the transaxle, the subframe and the wheels in response to a lateral force.

In the preferred embodiment of the present invention, the body is supported on the wheels by pillar type suspension units, however, unlike the conventional pillar suspension the coil springs are set to one side of the pillars rather than being positioned concentrically about them. The center line of each coil spring is arranged to intersect the center of its adjacent wheel. By installing the spring over the wheel so that the axis of the spring intersects the center of the wheel, a bending moment is placed on the upper end of the strut by the spring which is equal to the bending moment applied to the lower end of the strut by the transmission of the vertical wheel load through the wheel and hub assembly. Since the two bending moments are equal, there is theoretically no side load on the sliding bearings within the telescopic strut assembly due to spring load at designed height. There are lateral forces on the wheel, such as accelerating and braking forces, which will create side loads on the strut bearings.

The many objects and advantages of the present invention will become apparent from the following detailed discussion and the accompanying drawing in which:

FIGURE 1 is a top plan view of an independent rear vehicle suspension incorporating the present invention;

FIGURE 2 is a side elevational view of the suspension in FIGURE 1;

FIGURE 3 is a rear elevational view; and

FIGURE 4 is a top plan view corresponding to FIGURE 1 showing the arrangement of components as they exist in response to a lateral force on the vehicle body.

Referring now to the drawings for a better understanding of the invention, FIGURE 1 illustrates an independent rear suspension system for a motor vehicle that is connected to a frame structure 10. The frame assembly 10 supports a vehicle body 8. The drawings illustrate a vehicle construction wherein the frame 10 is separable from the body 8, however, the invention is equally applicable to vehicles having an integral frame formed of body sheet metal. As used in the appended claims, the term vehicle support structure includes both frame and body members.

The frame structure 10 includes rear side rails 12 and 14 that are connected to intermediate side rails 16 and 18 by right and left torque boxes 20 and 22. The vehicle is provided with a combination differential and transmission which is referred to as a transaxle and identified by the reference numeral 24. The input of the transaxle 24 receives power from a propeller shaft 26 which is connected to a universal joint 28 and constitutes a power delivery unit for the driving wheels of the vehicle.

The transaxle 24 is mounted on a subframe assembly 30. The subframe assembly 30 includes a front cross member 32 that is bolted to the front of the transaxle 24 and a rear cross member 34. A pair of forwardly diverging side frame members 36 and 38 interconnect the outer ends of the cross frame members 32, 34. The forward ends of the side frame members 36 and 38 are pivotally connected to shackle or link assemblies 40 and 42. The links 40 and 42, in turn, are pivotally connected to brackets 44 and 46 which are secured to the right and left rear side rails 12, 14, respectively, of the main vehicle frame 10.

A pair of leaf springs 48 and 50 are secured to the left and right subframe member 36 and 38 and extend rearwardly therefrom. The rear end of the leaf springs 48 and 50 are interconnected by a link 52 which has its right and left ends pivotally connected to the ends of the springs 48 and 50. A rear cross frame member 54 interconnects the rear side rails 12, 14 and provides support for a frame mounted bracket 56. The frame mounted bracket pivotally supports the cross link 52 by a pivot bolt 58.

Right and left driving road wheels 60 and 62 are positioned laterally of the transaxle 24 by a pair of axle shaft assemblies 64 and 66. The inner end of axle 64 is connected to the output of the transaxle's differential by universal joint 68 and to the wheel by an outer universal joint 70. Similarly, the left axle shaft 66 is provided with inner and outer universal joints 72 and 74. The universal joints and axle shafts comprise shaft assemblies of fixed length to position the wheels 60 and 62 laterally of the transaxle 24.

The longitudinal positions of the wheels 60, 62 with respect to the vehicle frame 10 are determined by right and left suspension arms 76 and 78. The rear end of suspension arm 76 is connected to the frame bracket 56 by a spike-type mount having a pair of rubber bushings 78 that are located by a pair of nuts threaded on the end of the arm 76. This construction permits the arm 76 to traverse a vertical jounce and rebound path. The forward end of the arm 76 is connected to the wheel bearing support 80 by a hinge type pivotal connection 82. In a similar fashion, the left arm 78 is connected to the frame bracket 56 by a pair of resilient elements 84 and to the left wheel bearing support 85 by a hinge type connection 86.

A telescopic strut 88 has its lower end secured to the left wheel support 85 and its upper end secured to sheet metal structure 90 of the body 8. The telescopic strut 88 is a linearly extendible device for controlling the wheel camber angle. The upper end of the strut is connected to the body structure 90 by resilient rubber mounts 92.

The conventional pillar suspension employs a coil spring that is concentric about the strut. In a suspension of the present invention, a coil spring 94 is positioned to one side of the strut 88 with its central axis arranged to intersect the center of the wheel 62 in both the side and rear elevational views. The upper end of the spring 94 is secured by a spring seat 95 that is affixed to upper end of the strut portion that is connected to the body structure 90. The lower spring seat 97 is secured to the body of the strut 88.

By installing the spring 94 over the wheel 62 so that the axis of the spring intersects the center of the wheel, a bending moment is placed on the upper end of the strut 88 by the spring 94. This bending moment is equal to the bending moment applied to the lower end of the strut 88 by the transmission of the vertical wheel load through the wheel bearing support 85. Since the two bending moments are equal, there is theoretically no side load on the sliding bearings within the telescopic strut assembly 88 due to spring load at designed height. Other forces may produce side loadings, however, such as those occurring during braking or accelerating.

In a similar fashion, a strut 96 is provided for the right-hand wheel 60. The strut 96 positions the right coil spring 98.

FIGURE 4 illustrates the shifting of the transaxle 24 and subframe assembly 30 and the displacement of the steering angle of the wheels that are created during cornering. The displacements are shown somewhat exaggerated to better illustrate the point. Assuming that the vehicle of FIGURE 1 is executing a lefthand turn, a centrifugal force A will act upon the body as shown in FIGURE 4. The lateral force A will tend to shift the body 8 and its frame 10 to the right-hand side with respect to the wheels 60, 62 which are rolling on the ground. Due to the fact that the transaxle subframe 30 is supported by the pair of links 40 and 42 and includes the leaf spring members 48 and 50, any lateral forces acting upon the frame 10 (such as centrifugal force occurring during a left-hand turn) will permit the frame 10 to move to the right with respect to the wheels 60, 62. The wheels 60, 62, acting through the axles 64, 66, will force the transaxle 24 and its subframe 30 to deflect in a manner illustrated in FIGURE 4. It is noted that the lateral deflection is accompanied by canting of the wheels as the suspension arms 76, 78 pivot in a horizontal plane about their connections with the bracket 56. By canting the wheels, 60, 62 in the direction illustrated, these wheels will tend to turn the vehicle out of the curve and provide an effect known as understeer. Understeer is generally recognized as contributing to vehicle stability during cornering.

In the present case, the understeer is known as side thrust understeer because it is responsive to lateral forces. This is understeer of a type that is distinguishable from roll understeer which is responsive to body roll to produce the steering effect. Side thrust understeer is generally recognized as being preferable to body roll understeer.

In a suspension of the present invention, the wheel camber angle changes only slightly with vertical displacement of the wheel. In this respect, it is better than a pure trailing arm suspension. A relationship between camber angle and slip angle exists for conventional tires. Approximately one degree of steering angle will compensate for the steering effect of five degrees of camber. In other words, the oversteering created by camber loss in cornering can be eliminated by steering the rear wheels away from the direction in which they are leaning.

The transaxle mounting arrangement of the present invention provides rear wheel steering to compensate for this camber loss and, in addition, provides understanding required for good handling with an increased rear suspension load. A transverse or lateral force applied to the body is resisted by the wheels, drive shafts, universal joints, transaxles and transaxle mounts. The flexible spring controlled transaxle mounts allow the body to be displaced laterally a distance proportional to the side force. The lower suspension arm is moved with the body and changes the steering direction of both rear wheels.

The foregoing description presents the presently preferred embodiment of this invention. Alterations and modifications may occur to those skilled in the art that will come within the scope and spirit of the following claims.

I claim:

1. An independent vehicle suspension system comprising vehicle support structure, a power delivery unit, resilient means mounting said power delivery unit on said support structure, a pair of driving wheels positioned laterally of said power delivery unit, a pair of articulated axle assemblies interconnecting said wheels and said power delivery unit, said axle assemblies each being of a fixed length, a pair of wheel support members rotatably supporting said wheels, a pair of suspension arms interconnecting said support structure and said wheel support members, said arms diverging in a forwardly and outwardly direction from said support structure, said resilient means comprising a subframe assembly supporting said power delivery unit, a pair of links connecting one end of said subframe assembly to said vehicle support structure, leaf spring means connecting the other end of said subframe assembly to said vehicle support structure, said resilient means being constructed to permit said vehicle support structure to move laterally relative to said power delivery unit, said subframe assembly and said wheels in response to a lateral force whereby said suspension arms cause said wheels to cant in an understeer direction, a telescopically slideable strut interconnecting each of said wheel support members and said vehicle support structure, each of said struts having a coil spring connected thereto, the center line of each of said coil springs being arranged to intersect the center of its adjacent wheel.

2. An independent vehicle suspension system comprising vehicle support structure, a power delivery unit, resilient means mounting said power delivery unit on said support structure, a pair of driving wheels positioned laterally of said power delivery unit, a pair of articulated axle assemblies interconnecting said wheels and said power delivery unit, said axle assemblies each being of a fixed length, a pair of wheel support members rotatably supporting said wheels, a pair of suspension arms interconnecting said support structure and said wheel support members, said arms diverging in a forwardly and outwardly direction from said support structure, said resilient means comprising a subframe assembly supporting said power delivery unit, a pair of links connecting one end of said subframe assembly to said vehicle support structure, leaf spring means connecting the other end of said subframe assembly to said vehicle support structure, said resilient means being constructed to permit said vehicle support structure to move laterally relative to said power delivery unit, said subframe assembly and said wheels in response to a lateral force whereby said suspension arms cause said wheels to cant in an understeer direction.

3. An independent vehicle suspension system comprising vehicle support structure, a power delivery unit, resilient means mounting said power delivery unit on said support structure, a pair of driving wheels positioned laterally of said power delivery unit, a pair of articulated axle assemblies interconnecting said wheels and said power delivery unit, said axle assemblies each being of a fixed length, a pair of wheel support members rotatably supporting said wheels, a pair of suspension arms interconnecting said support structure and said wheel support members, said arms diverging in a forwardly and outwardly direction, said resilient means comprising a linkage system connecting said power delivery unit to said vehicle support structure, said resilient means being constructed to permit said vehicle support structure to move laterally relative to said power delivery unit, and said wheels in response to a lateral force whereby said suspension arms cause said wheels to cant in an understeer direction.

4. An independent vehicle suspension system comprising vehicle support structure, a power delivery unit, resilient means mounting said power delivery unit on said support structure, a pair of driving wheels positioned laterally of said power delivery unit, a pair of articulated axle assemblies interconnecting said wheels and said power delivery unit, said axle assemblies each being of a fixed length, a pair of wheel support members rotatably supporting said wheels, a pair of suspension arms interconnecting said support structure and said wheel support members, said resilient means having substantially greater lateral flexibility then vertical flexibility and being constructed to permit said vehicle support structure to move laterally relative to said power delivery unit and said wheels in response to a lateral force whereby said suspension arms cause said wheels to cant in an understeer direction, a resilient telescopically slideable strut assembly comprising a plurality of elements interconnecting each of said wheel support members and said vehicle support structure, said wheel support member being rigidly secured to one end of one of said elements for relative movement of said strut assembly elements solely in an axial direction.

5. An independent vehicle suspension system comprising vehicle support structure, a power delivery unit, mounting means connecting said power delivery unit on said support structure, a pair of driving wheels positioned laterally of said power delivery unit, a pair of articulated axle assemblies interconnecting said wheels and said power delivery unit, said axle assemblies each being of a fixed length, a pair of wheel support members rotatably supporting said wheels, a pair of suspension arms interconnecting said support structure and said wheel support members, said mounting means comprising a laterally displaceable articulate linkage means pivoted about vertical axes, said linkage means being constructed to permit said vehicle support structure to move laterally relative to said power delivery unit, and said wheels in response to a lateral force whereby said suspension arms cause said wheels to cant in a steering attitude.

6. A suspension system according to claim 5 and including:
said mounting means also comprising resilient means constructed to resist the lateral movement of said support structure.

7. An independent vehicle suspension system comprising vehicle support structure, a power delivery unit, resilient means mounting said power delivery unit on said support structure, a pair of driving wheels positioned laterally of said power delivery unit, a pair of articulated axle assemblies interconnecting said wheels and said power delivery unit, said axle assemblies each being of a fixed length, a pair of wheel support members each supporting one of said wheels for rotation about an axis fixed with respect thereto, a pair of suspension arms interconnecting said support structure and said wheel support members, said arms diverging in a forwardly and outwardly direction, said resilient means being constructed to permit said vehicle support structure to move laterally relative to said power delivery unit, and said wheels in response to a lateral force whereby said suspension arms cause said wheels to cant in an understeer direction.

8. An independent vehicle suspension system comprising vehicle support structure, a power delivery unit, means mounting said power delivery unit on said support structure, a pair of driving wheels positioned laterally of said power delivery unit, a pair of axle assemblies interconnecting said wheels and said power delivery unit, a pair of wheel support members rotatably supporting said wheel, suspension arm means interconnecting said support structure and said wheel support members, a telescopically slideable strut interconnecting each of said wheel support members and said vehicle support structure, each of said struts having a coil spring connected thereto, the center line of each of said coil springs being arranged to intersect the center of its adjacent wheel, the centerline of said strut being displaced from the centerline of the adjacent coil spring.

9. An independent vehicle suspension system comprising vehicle support structure, a pair of road wheels positioned laterally of the center of said support structure, a pair of wheel support members rotatably supporting said wheels, suspension arm means interconnecting said support structure and said wheel support members, a telescopically slideable strut interconnecting each of said wheel support members and said vehicle support structure, each of said struts having a coil spring connected thereto, the center line of each of said coil springs being arranged to intersect the center of its adjacent wheel, the centerline of said strut being displaced from the centerline of the adjacent coil spring.

References Cited

UNITED STATES PATENTS

| 2,228,413 | 1/1941 | Smalley | 180—43 |
| 2,393,623 | 1/1946 | Ehrenberg | 180—64 |

FOREIGN PATENTS

| 430,977 | 1/1935 | Great Britain. |
| 656,383 | 8/1951 | Great Britain. |
| 520,654 | 3/1955 | Italy. |
| 567,290 | 10/1957 | Italy. |

A. HARRY LEVY, *Primary Examiner.*